Apr. 3, 1923.  
R. A. MULL  
FISH ROD  
Filed Nov. 19, 1921  
1,450,700
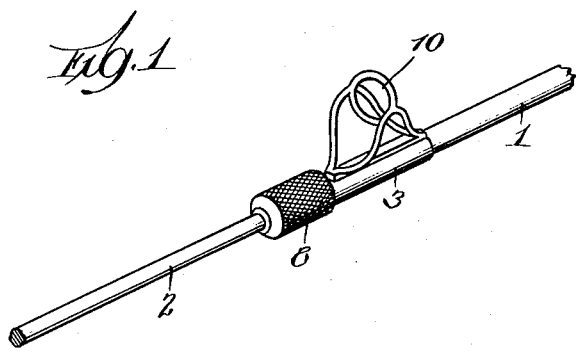
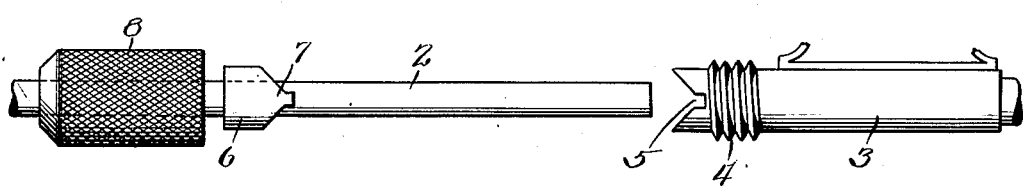
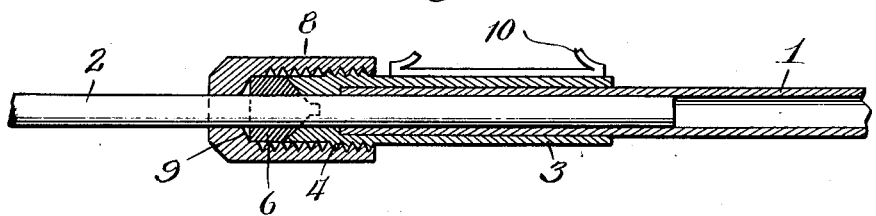
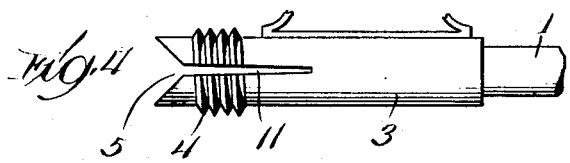
Inventor  
Raymond A. Mull  
by Arthur F. Durand  
Atty.

Patented Apr. 3, 1923.

1,450,700

UNITED STATES PATENT OFFICE.

RAYMOND A. MULL, OF BENTON HARBOR, MICHIGAN, ASSIGNOR TO HOLLAND ROD MANUFACTURING COMPANY, OF ST. JOSEPH, MICHIGAN, A CORPORATION.

FISH ROD.

Application filed November 19, 1921. Serial No. 516,440.

*To all whom it may concern:*

Be it known that I, RAYMOND A. MULL, a citizen of the United States, and a resident of Benton Harbor, county of Berrien, State of Michigan, have invented a certain new anl useful Improvement in Fish Rods, of which the following is a specification.

This invention relates to fish rods of the kind in which the sections thereof, at least some of which are preferably tubular rod sections of different diameters, so that the rod as a whole tapers toward its outer end, are connected together by means forming separable joints between them, whereby the rod can be unjointed or taken apart in the usual and well known manner.

Generally stated, the object of the invention is to provide a novel and improved construction whereby the sections of the rod are not only securely connected together, to form easily separable joints, but are also held in alinement with each other, so that the means on the different sections for holding the fish line against the rod will be in line on one side of the rod.

It is also an object to provide certain details and features of construction tending to increase the general efficiency and the desirability of a sectional fish rod of this particular character.

To the foregoing and other useful ends the invention consists in matters hereinafter set forth and claimed and shown in the accompanying drawings in which:
Figure 1 is a perspective of a portion of a sectional fish rod, showing a separable joint therefor, embodying the principles of the invention.

Figure 2 is a side elevation of these portions of the fish rod, showing the joint separated, this view being on a larger scale.

Figure 3 is a longitudinal section of said joint, showing the two sections of the rod connected together.
Figure 4 is a detail view showing another form of the invention.

As thus illustrated, the fish rod comprises any suitable number of sections, but two sections will be sufficient to illustrate the invention. The tubular rod or hollow section 1 is adapted to receive the end section or smaller rod 2, as shown, and said section 1 is provided with a tube 3 forming a fixed sleeve thereon and externally threaded at 4 near its outer end. This tube 3, as shown is provided with a notch 5 in the end thereof. The section 2 has a collar 6 fixed thereon and provided with a projection 7 to engage said notch. The rotary sleeve 8 slides and rotates on the section 2 and is formed internally with a shoulder 9 to engage the collar 6, and is internally threaded to engage the screw threads 4, whereby the meeting ends of the tube 3 and the collar 6 will be drawn together. The insertion of the projecting end of section 2 is limited only by engagement of the sleeve 3 with the collar 6, as shown, so that no endwise compression is exerted on the section 2 by the tightening of the screw joint. This will not only provide a strong and easily separable joint, but it is also true that the two sections of the rod will be brought into proper alinement, inasmuch as the tube 3 and collar 6 are so relatively formed that the two sections of the rod cannot rotate or turn relatively to each other. This is desirable, of course, so that the devices which are attached to the different sections of the rod, such as the ring 10, will all be located on the same side of the rod and in alinement with each other when the sections of the rod are connected together.

In Figure 4 the construction is similar to that previously described, but in this case the tube 3 is split longitudinally for a distance, as at 11, from its outer end, and the screw threaded portions are tapered, whereby the screwing of the sleeve 8 onto the tube will compress the latter upon the rod 2, by contracting the slots 11 at opposite sides of the tube, in a manner that will be readily understood.

It will be understood, of course, that the joint can be constructed in various ways, so that a screw threaded connection will be provided, and it is also true, of course, that various relative formations can be employed for the tube 3 and the collar 6 to insure the alinement of the different sections of the rod, in the manner described.

What I claim as my invention is:

1. A fish rod comprising a plurality of sections of different diameters, so that the rod as a whole tapers toward the outer end thereof, and a joint between the sections, comprising an externally screw threaded tube forming a sleeve fixed on the tubular larger section, a collar fixed on the smaller section, to engage the end of said tube, with the end of the smaller section projecting some distance beyond said collar thereon to freely enter the bore of the larger section, so that the insertion is limited only by said engagement of the collar with the sleeve, and a rotary sleeve retained on the smaller section by said collar and threaded internally to screw upon said tube, thereby to force said collar into endwise engagement with said sleeve.

2. A fish rod as specified in claim 1, said tube and collar being formed to interlock and prevent relative rotation between the larger section and the smaller section.

3. A fish rod as specified in claim 1, said collar and tube being relatively formed to properly aline one section with the other.

4. A fish rod as specified in claim 1, said tube being split, and said sleeve being formed to compress the split tube on the smaller section.

5. A structure as specified in claim 1, and means on said sleeve to form a guide for the fish line.

RAYMOND A. MULL.